(12) United States Patent
Wu et al.

(10) Patent No.: US 9,354,354 B2
(45) Date of Patent: May 31, 2016

(54) LOOSE PACKED PHOXONIC CRYSTALS AND METHODS OF FORMATION

(71) Applicant: Toyota Motor Engineering & Manufacturing North America, Inc., Erlanger, KY (US)

(72) Inventors: Songtao Wu, Ann Arbor, MI (US); Kazuhisa Yano, Ann Arbor, MI (US); Debasish Banerjee, Ann Arbor, MI (US); Gaohua Zhu, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 619 days.

(21) Appl. No.: 13/734,008

(22) Filed: Jan. 4, 2013

(65) Prior Publication Data
US 2014/0190396 A1    Jul. 10, 2014

(51) Int. Cl.
C30B 29/34    (2006.01)
G02B 1/00    (2006.01)
G02B 6/122    (2006.01)

(52) U.S. Cl.
CPC .............. G02B 1/005 (2013.01); G02B 6/1225 (2013.01)

(58) Field of Classification Search
CPC ................................ C30B 29/34; C30B 31/04
See application file for complete search history.

(56) References Cited

U.S. PATENT DOCUMENTS

| | | | |
|---|---|---|---|
| 5,266,238 A | 11/1993 | Haacke et al. | |
| 5,368,781 A | 11/1994 | Haacke et al. | |
| 6,517,763 B1 | 2/2003 | Zakhidov et al. | |
| 6,544,800 B2 | 4/2003 | Asher | |
| 6,858,079 B2 | 2/2005 | Norris et al. | |
| 6,946,086 B2 | 9/2005 | Foulger et al. | |
| 7,538,933 B2 | 5/2009 | Nakayama et al. | |
| 7,826,131 B2 | 11/2010 | Arsenault et al. | |
| 2004/0131799 A1 | 7/2004 | Arsenault et al. | |
| 2011/0014380 A1 | 1/2011 | Fudoji et al. | |
| 2011/0222142 A1* | 9/2011 | Arsenault | ............ 359/297 |

OTHER PUBLICATIONS

J.F. Galisteo-Lopez et al., "Self-Assembled Photonic Structures," Adv. Mater., 23, 30-69, 2011.
H. Fudouzi et al., "Photonic Papers and Inks: Color Writing with Colorless Materials," Adv. Mater., 15(11), 892-896, 2003.
H. Fudouzi et al., "Colloidal crystals with tunable colors and their use as photonic papers," Langmuir, 19, 9653-9660, 2003.
H. Fudouzi et al., "Photonic rubber sheets with tunable color by elastic deformation," Langmuir, 22(3), 1365-1368, 2006.
E. Yablonovitch, "Inhibited Spontaneous Emission in Solid-State Physics and Electronics," Phys. Rev. Lett., 58(20), 2059-2062 (1987).

(Continued)

*Primary Examiner* — Robert M Kunemund
(74) *Attorney, Agent, or Firm* — Dinsmore & Shohl LLP

(57) ABSTRACT

Processes of forming an irreversibly loose packed structure of particulate material useful as a photonic or phononic crystal are provided. Matrix material is infilled between particles and extends above the particles to form a particulate free matrix layer. Removing the matrix layer causes deformation of or exposes the spacing between the particles. The spaces are infilled by additional matrix material that when cured produces a supported and irreversibly loose packed crystalline structure of particles producing differing bandgaps and transmissive properties relative to the original structure. The processes provided allow for economical tuning of the transmissive properties of photonic or phononic crystals.

28 Claims, 2 Drawing Sheets

(56) References Cited

OTHER PUBLICATIONS

S. Asher et al., "Self-Assembly Motif for Creating Submicron Periodic Materials. Polymerized Crystalline Colloidal Arrays," J. Am. Chem. Soc., 116, 4997-4998 (1994).

J. Jethmalani et al., "Diffraction of Visible Light by Ordered Monodisperse Silica-Poly(methyl acrylate) Composite Films," Chem. Mater., 8, 2138-2146 (1996).

S. Foulger et al., "Photonic Bandgap Composites," Adv. Mater., 13(24), 1898-1901 (2001).

* cited by examiner

LOOSE PACKED PHOXONIC CRYSTALS AND METHODS OF FORMATION

FIELD OF THE INVENTION

The invention relates to the field of photonic or phononic crystals. In particular, the present disclosure describes a loose packed crystal material and methods of formation by predominantly one dimensional expansion allowing tuning of photonic or phononic properties.

BACKGROUND OF THE INVENTION

Photonic crystals are materials having a periodic modulation in their refractive index (Yablonovitch, *Phys. Rev. Lett.*, 58:2059, 1987). This periodic modulation creates a photonic band gap that either attenuates or is permissive to the propagation of electromagnetic waves of particular wavelengths. Band gap positioning is defined by the distance between the periodic modulations in the crystal. The reflected stop band wavelengths can appear in the reflectance spectrum as a distinct reflectance peak known as a Bragg peak. The crystal may have a one-, two-, or three-dimensional (3D) periodic structure.

Similar devices known as phononic crystals have a phononic band gap, which is the acoustic analog of a photonic band gap. In a phononic crystal, it is a desired range of acoustic frequencies that cannot exist in the structured material. Depending on the material used, a particular crystalline structure can be adjusted to create a bandgap for waves of either photonic or phononic nature. Such crystals are known as phoxonic crystals.

Bandgaps in phononic or photonic crystals are created by the presence of periodic scatter material in a homogeneous host matrix that propagates an energy wave. This scattering material sets up wave interference. If the interference is destructive, the energy of the wave is negated, and the wave cannot propagate through the crystal. It is this destructive interference that creates the bandgap. Minor changes in the lattice spacing of a photonic or phononic crystal produce easily detectable shifts of the reflected stop band. Examples of tuning the bandgap during crystal formation can be found in U.S. Patent Application Publication No. 2004/0131799, and U.S. Pat. No. 7,826,131.

External stimuli such as physical deformation, swelling with a solvent material, or application of a potential can be used to alter the periodic spacing of the crystal structure. A tunable crystal by deformation of an already formed material to create a loose packed structure of spheres embedded in a hydrogel or elastomer matrix has been done as is found in U.S. Patent Application Publication Nos. 2011/0222142 and 2011/0014380, U.S. Pat. Nos. 7,826,131, 7,538,933, 6,544,800, 5,266,238, 5,368,781, and in publications of H. Fudouzi and Y. Xia, "Photonic Papers and Inks: Color Writing with Colorless Materials," *Advanced Materials*, 15(11), 892-896, 2003, H. Fudouzi and Y. Xia, "Colloidal crystals with tunable colors and their use as photonic papers," *Langmuir*, 19, 9653-9660, 2003, H. Fudouzi and T. Sawada, "Photonic rubber sheets with tunable color by elastic deformation," *Langmuir*, 22(3), 1365-8 (2006), Holtz et al., *Nature* 389:829-832, Foulger et al., *Advanced Materials* 13:1898-1901, Asher et al., *Journal of the Material Chemical Society* 116:4997-4998, and by Jethmalani et al. *Chemical Materials* 8:2138-2146.

These post-formation tuning methods, however, are reversible so as to be considered temporary. For example, it is known to adjust the bandgap of a photonic crystal by swelling a colloidal particle array embedded in a matrix using a solvent. Fudouzi and Xia formed photonic crystal papers that would swell in the presence of an ink or solvent such as 1-propanol. (*Langmuir*, 2003; 19:9653-9660.) Upon evaporation of the solvent, the paper returned to its original position.

The reversibility of prior crystal materials negates their usefulness for long term applications where loose packed crystal structures are desired. As such, new methods are needed for the cost effective and rapid formation of loose ordered crystal structures of periodic material.

SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

Provided are methods for forming structures useful as photonic, phononic, or phoxonic crystals that solve prior issues with formation of an irreversibly loose packed ordered array of elements in the crystal that provide the necessary characteristics. Methods of forming such irreversibly loose packed ordered structures include: providing a first ordered structure having a lattice of dispersed elements embedded in a matrix material, the structure having an initial lattice parameter, and a matrix layer extending above the dispersed elements; removing the matrix layer from the first ordered structure, infilling with a second matrix material to form a second ordered structure with the lattice parameter having a greater length than in the first ordered structure; and polymerizing the second matrix material to form an irreversibly loose packed ordered structure. By removing the original matrix layer and infilling the new matrix material, force in the Z-direction is transferred throughout the structure including the dispersed elements, which serves to expand their arrangement, their size or orientation, or all three, predominantly in the direction perpendicular to the substrate. The formation of a loose packed ordered structure is primarily by one dimensional expansion, or optionally tailored to different directions in different areas of the structure. The steps of removing and infilling are optionally repeated to generate an additionally loose packed structure.

Among the many powers of the method is that it is useful with dispersed elements of many different sizes or combinations of sizes. In some embodiments, at least a portion of the dispersed elements have a diameter of 1 nanometer to 10 millimeters. Dispersed elements of polystyrene or silica, optionally with a diameter of 50 to 1000 nm, optionally 150 to 750 nm, are used in any matrix, and in some embodiments, in PDMS as a matrix material.

The structures formed by these methods may be photonic, phononic, or phoxonic crystals.

These methods for the first time provide irreversibly loose packed structures of dispersed elements whereby the crystal packing of the dispersed elements is easily tunable by the choice of infilling materials or by the number of replicates of removing and infilling.

DETAILED DESCRIPTION OF EMBODIMENTS OF THE INVENTION

Figure 1:
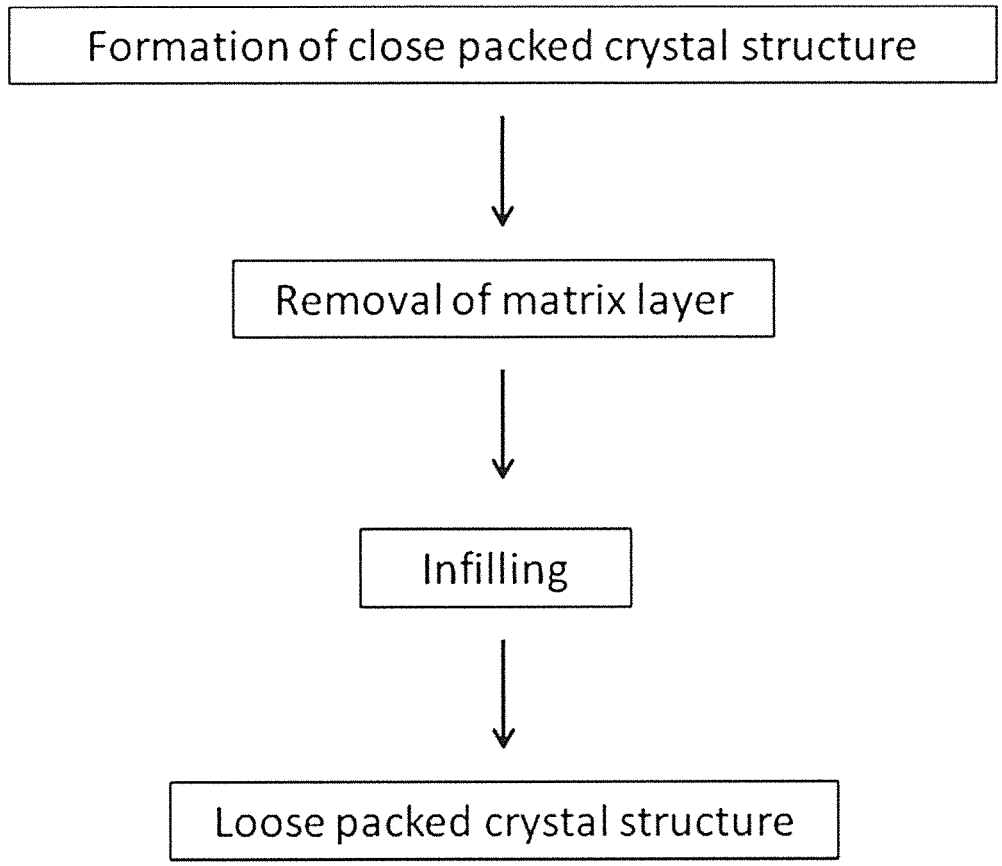
FIG. 1 is a general schematic of the formation of an irreversibly loose packed ordered structure.

The following description of particular embodiment(s) is merely exemplary in nature and is in no way intended to limit the scope of the invention, its application, or uses, which may, of course, vary. The invention is described with relation to the non-limiting definitions and terminology included herein. These definitions and terminology are not designed to function as a limitation on the scope or practice of the invention but are presented for illustrative and descriptive purposes only. While the processes or compositions are described as an order of individual steps or using specific materials, it is appreciated that steps or materials may be interchangeable such that the description of the invention may include multiple parts or steps arranged in many ways as is readily appreciated by one of skill in the art.

Scientific and technical terms used herein are intended to have the meanings commonly understood by those of ordinary skill in the art.

Processes and systems are provided that create an irreversibly loose packed ordered structure of material that is suitable for a tuned and constant phononic or photonic crystal device capable of insulating or transmitting energy with specific characteristics. Such devices are used for sound insulation, heat insulation, transmission or absorption of light of desired wavelengths, or for many other purposes as is recognized in the art. Facile methods are provided to fabricate loose-packed colloid crystals in a hydrophobic polymeric matrix (e.g. PDMS). The lattice constant of the loose-packed ordered structure is irreversibly tuned to provide long term properties of photon or phonon propagation or destruction in the crystals.

A process includes: providing a first ordered structure of dispersed elements embedded in a matrix material wherein the structure has an initial lattice parameter; removing a matrix layer of the matrix material from the structure to form a second ordered structure with the lattice parameter having greater length relative to the initial lattice parameter; and infilling the second ordered structure with a second matrix material thereby forming an irreversibly loose packed ordered structure. The use of infilling with a curable or permanent second matrix material supports the presence of the longer lattice parameter so that it is prevented from reverting to the original structure dimensions, yet remains subsequently tunable by methods such as mechanical, electrical, or chemical deformation techniques.

A first ordered structure is provided by formation of a close packed plurality of dispersed elements. In some examples, the structure is a photonic crystal material, phononic crystal material, or phoxonic crystal material. The crystal material preferably has, but is not required to have, an ordered structure such as an ordered lattice spacing. In some exemplary embodiments, the structure has an ordered array of voids and may be polymer-based, so as to be deformable. The structure material may be fabricated so as to have a characteristic reflection peak from an incident surface.

The ordered structure includes a plurality of dispersed elements and a matrix material whereby the dispersed elements are embedded in the matrix material, optionally in an ordered system (e.g., the structure given during manufacturing) having one or more initial lattice parameters. A lattice parameter is illustratively a crystal packing parameter such as the distance between the center of a first dispersed element and the center of a second dispersed element in any plane. A plurality of dispersed elements may form an ordered cubic crystal system such as a primitive cubic, a face centered cubic, or a body centered cubic system. In some embodiments, a plurality of dispersed elements is in a random ordered configuration. A lattice parameter is optionally the distance between the center of one dispersed element to the center of an adjacent dispersed element along the Z-axis of the material (e.g. along the plane of thickness).

In some embodiments, a dispersed element includes a void. A void represents a bound volume with a different refractive index or otherwise a different material than that of a matrix material surrounding a dispersed element, or portion thereof. A lattice parameter is optionally the center of one void to the center of an adjacent void in any direction, optionally along the Z-axis. A void can be gaseous, solid or liquid.

A dispersed element is optionally formed of a colloidal particle. A colloidal particle is illustratively formed from polymer latexes and silica spheres as a few examples. A dispersed element may be in any desirable shape, illustratively spheres, ellipsoids, rods, sphere containing polyhedra, cubes, and polyhedra. In particular embodiments, a dispersed element is in the shape of a sphere. A dispersed element has a diameter or length along a single axis. A diameter or length along a Z-axis is illustratively from 1 nm to 10 mm, or any value or range therebetween. For optical applications a diameter or length is optionally from 1 nm to 1000 nm, 50 to 1000 nm, 60 to 1000 nm, 50 to 500 nm, or 150-900 nm. For uses as thermal insulation or heat management, a diameter or length is optionally 0.1 nm to 500 nm, 1 nm to 200 nm, 10 nm to 100 nm, or others as desired. For uses as a phononic crystal, a length or diameter is optionally 500 nm to 10 mm, optionally 1000 nm to 10 mm, optionally greater than 1000 nm to 10 mm. Other values or ranges may be used in particular embodiments to achieve particular characteristics of the resulting photonic or phononic crystal materials.

Illustrative examples of materials used for a dispersed element include, but are not limited to insulators, polymers, metals, and semiconductors. Optionally, a dispersed element may be formed from one or more polymer, oxide, or chalcogenide colloidal particles. More specific examples of dispersed elements include: silicon dioxide (silica, $SiO_2$); polystyrene; polymethacrylate; air; metals illustratively Si, Al, or others; mesoporous monodispersed silica spheres (MMSS); MMSS hybrids; among others.

A plurality of dispersed elements is embedded in a matrix material. A matrix material is illustratively a rigid or deformable material. Optionally, a matrix material is a curable material. A matrix material is optionally formed from curing of one or more precursor materials substantially as described in U.S. Patent Application Publication No: 2011/0222142. For example, a precursor may be a mixture of monomers, crosslinkers, initiators, solvents, plasticizers, surfactants, or additives. In some examples, the matrix material may be formed from a monomer and/or pre-polymer, for example acrylates, methacrylate, olefins, ethers, alcohols, polyols, olefins, amino acids, fluoromonomers, biomonomers, cyclic monomers, methacrylic acid esters, acrylic acid esters, isoprene, butadiene, polyurethane precursors, crosslinkable polyethers, polymerizable oligomers, and mixtures thereof. A wide variety of polymerizable monomers and crosslinkers are available from Sartomer Company, Inc. Other possible materials are disclosed in U.S. Pat. No. 6,946,086.

The matrix material may include a crosslinker. Illustrative examples of a crosslinker include but are not limited to dimethacrylates, trimethacrylates, tetramethacrylates, diacrylates, triacrylates, and tetraacrylates. The amount of crosslinkers and initiators in the precursor mixture may be selected to achieve a desired amount of cross-linking in the cured polymer. Possible precursor compositions include mixtures including about 0-100 weight percent monomer, 0-100 weight percent cross-linker or cross-linkable polymer, and 0-20 weight percent initiator. In some compositions, the cross-linker itself may be the basis for the polymer, thus forgoing the need for a monomer. The density of cross-links in the cured polymer may be controllable by the proportion of cross-linker in the precursor mixture. The porosity of the cured polymer may be controlled by including in the precursor mixture an inert substance, such as a solvent, which can be removed after curing, for example through evaporation. A variety of polymeric and non-polymeric additives may be added to modify the properties of the resulting matrix material.

The precursor mixture may include an initiator. Examples of initiators include photoinitiators such as phenylbis(2,4,6-trimethylbenzoyl)phosphine oxide. Additional examples include one or more thermal initiators, illustratively dicumyl peroxide.

More specific illustrative examples of matrix materials include polydimethyl siloxane (PDMS), epoxy resins, thermoset polymers, photoinitiated cross-linked polymers, or others. In particular examples a matrix material is PDMS.

A first ordered structure of a plurality of dispersed elements embedded in a matrix material is formed by any of many possible processes. Illustrative examples include self-assembly from free microparticles, and etching. Self-assembly methods include evaporation-induced self-assembly (EISA), isoconvective heating, sedimentation, shear assembly, parallel plate confinement, spin-coating, dip-coating, and drop-casting. Methods of sphere deposition are disclosed in U.S. Pat. No. 6,858,079. Microspheres used as dispersed elements may be synthesized according to a modified Stöber process. Optionally, a structure of colloidal crystals is formed by the methods of H. Fudouzi and Y. Xia, *Langmuir*, 2003; 19: 9653-9660; or H. Fudouzi and T. Sawada, *Langmuir*, 2006; 22(3): 1365-8.

Figure 2:
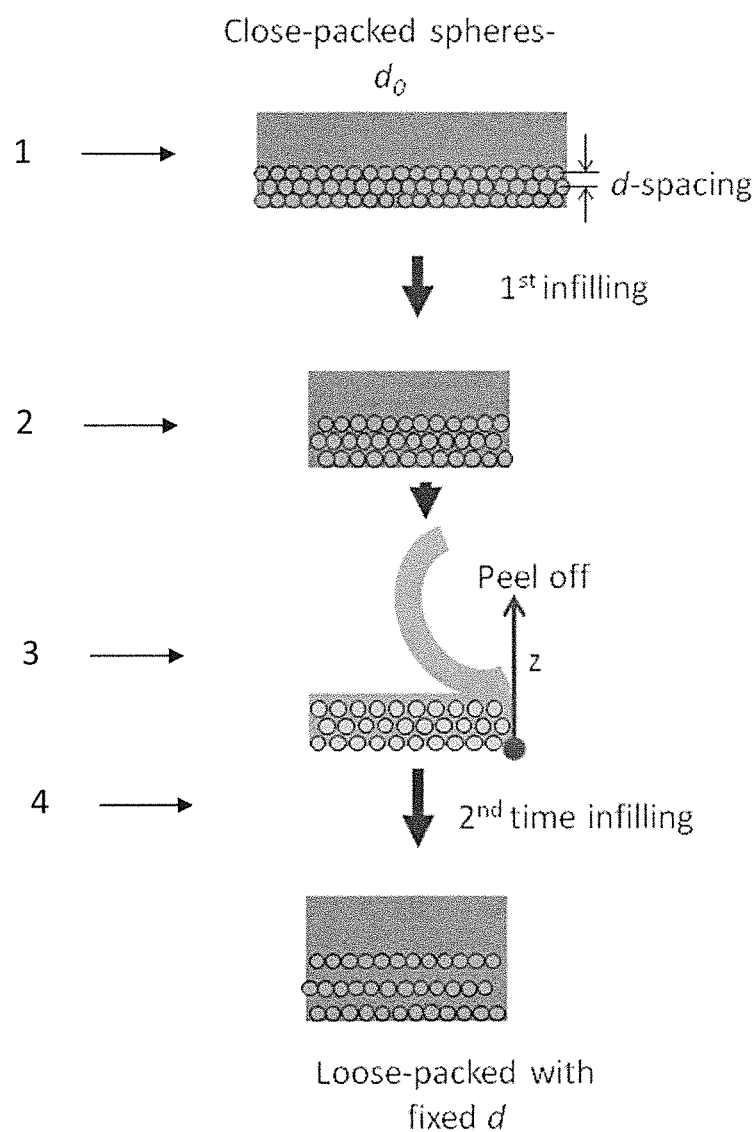
FIG. 2 is a general schematic of the formation of an irreversibly loose packed ordered structure of particles according to one embodiment.

An exemplary process of forming an irreversibly loose packed ordered structure is illustrated in FIG. 2. Illustratively as is shown in step 1, a substrate is used to support a solution of dispersed elements. The surface of the liquid solution of elements is optionally then covered with a layer of silicone (or other material) to control evaporation rates. During evaporation, the elements form a close packed ordered structure promoted by attractive capillary forces, or other forces. At step 2, the silicone layer is removed (if present) and the spaces between the elements are filled with uncured matrix material, illustratively PDMS, via capillary action. Following cure of the matrix material a first ordered structure of dispersed elements embedded in a matrix material is formed. It is appreciated that curing can proceed by one of many methods known in the art and depending on the type of matrix material used. Illustrative examples of curing modalities include ultraviolet (UV), air-curing, heat, electron beam, and other types of radiation induced curing. The packing of dispersed elements in the first ordered structure is close packed.

Many materials may be used as a substrate other than glass. Illustratively, a substrate may include paper, glass, plastic, metals, and ceramics.

The methods of embedding a matrix material preferably produce a matrix layer extending opposite the substrate and above the dispersed elements, illustratively as depicted in FIG. 2 at step 2. This matrix layer is optionally free of dispersed elements. The inventors surprisingly found that removing this matrix layer and subsequently infilling any spaces in the ordered structure underlying the matrix layer produces a substantially one dimensional expansion between the dispersed elements and producing a less closely packed ordered structure. As such, a process includes removing all or a portion of a matrix layer. In FIG. 2 at step 3, the matrix layer is removed by tearing or peeling in a vertical or other direction relative to a substrate. A matrix layer is optionally cut such as with a blade at one end of the resulting ordered structure to allow grabbing of the layer and subsequent removal. In some embodiments, removal does not proceed by association with an adhesive layer.

A second matrix material is used to infill the any spacing in the first matrix material that upon curing results in the irreversible longer lattice parameter as illustrated at step 4. The infilling by the second matrix material allows interaction with the first matrix material surrounding the dispersed elements. Without being limited to one particular theory, it is believed that the interaction between the first matrix material and the second matrix material forces expansion between the dispersed elements. Also, swelling in the horizontal directions is believed to be retarded by the presence of the substrate. Thus, expansion between dispersed elements is predominantly in the vertical direction (i.e. perpendicular to the substrate) creating a longer lattice parameter in a Z-axial direction. The curing of the second matrix material then fixes the predominantly one dimensional expansion between the dispersed elements and results in formation of a second ordered structure with a longer lattice parameter relative to the first ordered structure.

By repeating the removing and infilling of steps 3 and 4, the spacing between the dispersed elements can be made greater and the characteristics of the resulting photonic or phononic crystal materials are irreversibly altered to the extent desired by a user. Testing indicates that 20 or more replicates of removing and infilling can be performed without observable damage to a dispersed element such as silica or polystyrene sphere. The number of replicates of removal and infilling used to form a loose packed ordered structure of dispersed elements is optionally 1, 2, 3, 4, 5, 6, 7, 8, 9, 10, 11, 12, 13, 14, 15, 16, 17, 18, 19, 20, or more. In some embodiments, the last infilling step is performed so that no excess matrix material extends above the dispersed elements such that a matrix layer is absent, or is of reduced thickness relative to the matrix layers following a prior infilling step(s).

The steps of removing and infilling create for the first time irreversible loose ordered structures of dispersed elements that can be used as a permanently structured photonic or phononic crystal.

Also provided are photonic or phononic crystals formed by a process as described herein. Illustratively, an insulating material that will not transmit vibration, sound, heat, or light of desired energy or wavelength is formed by the processes of the invention.

Various aspects of the present invention are illustrated by the following non-limiting examples. The examples are for illustrative purposes and are not a limitation on any practice of the present invention. It will be understood that variations and modifications can be made without departing from the spirit and scope of the invention

EXAMPLE

Formation of an Ordered Loose Packed Colloidal Crystal

A loose packed ordered structure of a dispersion of polystyrene (PS) spheres is generated. PS spheres (diameter 200 nm) were obtained from Polysciences (Warrington, Pa.), Seradyn (Indianapolis, Ind.), or Duke Scientific (Palo Alto, Calif.), and used directly or diluted with ultrapure water for crystallization. A first ordered 3D structure of colloidal crystals is generated by drying aqueous dispersions of PS beads on glass substrates. A dispersion polystyrene (PS) beads in water (0.423 mL) was placed on a standard glass cover slip (23 mm×23 mm) and allowed to settle into a thin liquid film. The surface of this liquid film was then completely covered with a thin layer (100 μL) of silicone liquid (OMS-T11, 10 cSt). The cover slip was then placed on a vibration-free bench at room temperature (approx. 25° C.) and the water allowed to slowly evaporate by diffusing through the skin of liquid silicone (not just from the edge). During the evaporation, the PS beads were driven into a long-range ordered, opaline lattice by the attractive capillary forces generated during water evaporation.

After crystallization into the ordered lattice, the skin of liquid silicone was carefully removed from the surface of the colloidal crystal using Kim-Wipe, and the voids among PS beads were completely filled with the premixed elastomer of polydimethyl siloxane (PDMS) (Dow Corning, Midland, Mich. (Sylgard 184)) (200 μl) via capillary action. The PDMS elastomer was then air cured at room temperature for one night followed by additional hardening at 65° C. for 6 hours.

A sharp knife was used to create a slit at one end of the crystal, and the matrix layer above the slit was peeled off in a vertical direction. This vertical peeling created or allowed exposure of separations between the beads. A second amount of PDMS elastomer is added to the surface of the more loosely packed beads and allowed to penetrate the structure by capillary action. This second matrix material is then cured by the same process as the first PDMS elastomer to form an irreversibly loose packed array of beads.

The peeling/infilling stages are repeated to reach desired interplanar d-spacing. Interestingly, the previous PDMS matrix layer is capable of being peeled off without producing observable damage to the PS beads that remained on the glass substrate.

Various modifications of the present invention, in addition to those shown and described herein, will be apparent to those skilled in the art of the above description. Such modifications are also intended to fall within the scope of the appended claims.

It is appreciated that all reagents and materials are obtainable by sources known in the art unless otherwise specified.

Patents, publications, and applications mentioned in the specification are indicative of the levels of those skilled in the art to which the invention pertains. These patents, publications, and applications are incorporated herein by reference to the same extent as if each individual patent, publication, or application was specifically and individually incorporated herein by reference.

The foregoing description is illustrative of particular embodiments of the invention, but is not meant to be a limitation upon the practice thereof. The following claims, including all equivalents thereof, are intended to define the scope of the invention.

The invention claimed is:

1. A process for forming an irreversibly loose packed ordered structure comprising:
   providing a first ordered structure of dispersed elements embedded in cured a matrix material, said structure having an initial lattice parameter, and a cured matrix layer formed of said cured matrix material, said cured matrix layer extending above said dispersed elements opposite a substrate;
   removing said matrix layer from said first ordered structure;
   infilling said first ordered structure with a second matrix material to form a second ordered structure with said lattice parameter having a greater length than in said first ordered structure; and
   curing said second matrix material to form an irreversibly loose packed ordered structure.

2. The process of claim 1 wherein said greater length is along the Z-axis relative to a plane of said substrate.

3. The process of claim 1 wherein said step of removing is by peeling or tearing said matrix layer from said first ordered structure.

4. The process of claim 1 wherein said lattice parameter is parallel to the direction of said removing.

5. The process of claim 1 wherein at least a portion of said dispersed elements have a diameter of 1 nanometer to 10 millimeters.

6. The process of claim 1 wherein said dispersed elements are formed from an inelastic material.

7. The process of claim 1 wherein said dispersed elements are polystyrene, silica, mesoporous silica, or poly(methyl methacrylate).

8. The process of claim 1 wherein said matrix material is polydimethyl siloxane.

9. The process of claim 1 further comprising:
   removing a second matrix layer of said second matrix material from said second ordered structure;
   infilling said second ordered structure with a third matrix material to increase the length of said lattice parameter relative to said second ordered structure; and
   curing said third matrix material to form a third ordered structure that is an irreversibly loose packed ordered structure.

10. A process for forming an irreversibly loose packed photonic crystal comprising:
    providing a close packed photonic crystal with a first ordered structure of dispersed elements embedded in a matrix material, said structure having an initial lattice parameter, and a matrix layer extending above said dispersed elements, said matrix layer formed from said matrix material;
    removing said matrix layer from said structure;
    infilling said ordered structure with a second matrix material to form a second ordered structure with said lattice parameter having a greater length than in said first ordered structure;
    curing said second matrix material to form an irreversibly loose packed ordered structure;
    removing a second matrix layer of said second matrix material from said second ordered structure;
    infilling said second ordered structure with a third matrix material to form a third ordered structure with said lattice parameter having a greater length than in said second ordered structure; and
    curing said third matrix material thereby forming an irreversibly loose packed ordered structure.

11. The process of claim 10 wherein said dispersed elements are polystyrene beads or solid silica.

12. The process of claim 10 wherein said dispersed elements are polystyrene.

13. The process of claim 10 wherein said first matrix material or said second matrix material is polydimethyl siloxane.

14. The process of claim 10 wherein said dispersed elements are polystyrene.

15. The process of claim 10 wherein said dispersed elements are polystyrene beads or solid silica.

16. The process of claim 10 wherein said dispersed elements are polystyrene.

17. The process of claim 10 wherein said third matrix material is polydimethyl siloxane.

18. The process of claim 17 wherein said dispersed elements are polystyrene.

19. The process of claim 10 wherein said dispersed elements have a diameter of 50 to 1000 nanometers.

20. The process of claim 9 or 10 wherein said first matrix material, said second matrix material and said third matrix material have the same composition.

21. A process for forming an irreversibly loose packed ordered structure comprising:
providing a first ordered structure of dispersed elements embedded in a matrix material, said structure having an initial lattice parameter, and a cured matrix layer formed of said matrix material, said matrix layer extending above said dispersed elements opposite a substrate;
removing said matrix layer from said first ordered structure;
infilling said first ordered structure with a second matrix material to form a second ordered structure with said lattice parameter having a greater length than in said first ordered structure;
curing said second matrix material to form an irreversibly loose packed ordered structure;
removing a second matrix layer of said second matrix material from said second ordered structure;
infilling said second ordered structure with a third matrix material to increase the length of said lattice parameter relative to said second ordered structure; and
curing said third matrix material to form a third ordered structure that is an irreversibly loose packed ordered structure.

22. A process for forming an irreversibly loose packed photonic crystal comprising:
providing a close packed photonic crystal with a first ordered structure of dispersed elements embedded in a matrix material, said structure having an initial lattice parameter, and a matrix layer extending above said dispersed elements, said matrix layer formed from said matrix material;
removing said matrix layer from said structure;
infilling said ordered structure with a second matrix material to form a second ordered structure with said lattice parameter having a greater length than in said first ordered structure; and
curing said second matrix material to form an irreversibly loose packed ordered structure:
removing a second matrix layer of said second matrix material from said second ordered structure;
infilling said second ordered structure with a third matrix material to form a third ordered structure with said lattice parameter having a greater length than in said second ordered structure; and
curing said third matrix material thereby forming an irreversibly loose packed ordered structure.

23. The process of claim 22 wherein said dispersed elements are polystyrene beads or solid silica.

24. The process of claim 22 wherein said dispersed elements are polystyrene.

25. The process of claim 22 wherein said third matrix material is polydimethyl siloxane.

26. The process of claim 22 wherein said dispersed elements are polystyrene.

27. The process of claim 21 wherein said first matrix material, said second matrix material and said third matrix material have the same composition.

28. The process of claim 22 wherein said first matrix material, said second matrix material and said third matrix material have the same composition.

* * * * *